(12) United States Patent
Saijo

(10) Patent No.: US 11,048,234 B2
(45) Date of Patent: Jun. 29, 2021

(54) NUMERICAL CONTROL SYSTEM OF MACHINE TOOL

(71) Applicant: FANUC CORPORATION, Yamanashi (JP)

(72) Inventor: Yoshinori Saijo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/810,197

(22) Filed: Mar. 5, 2020

(65) Prior Publication Data

US 2020/0285220 A1    Sep. 10, 2020

(30) Foreign Application Priority Data

Mar. 7, 2019 (JP) .............................. JP2019-041580

(51) Int. Cl.
G05B 19/41 (2006.01)

(52) U.S. Cl.
CPC .... *G05B 19/41* (2013.01); *G05B 2219/34083* (2013.01)

(58) Field of Classification Search
None
See application file for complete search history.

(56) References Cited

U.S. PATENT DOCUMENTS

| 5,197,014 A * | 3/1993 | Seki ....................... G05B 19/41 |
| | | 318/573 |
| 2014/0156052 A1* | 6/2014 | Nishibashi ......... G05B 19/4103 |
| | | 700/112 |

(Continued)

FOREIGN PATENT DOCUMENTS

| JP | 2008-046913 A | 2/2008 |
| JP | 2009-028872 A | 2/2009 |
| WO | 03/067345 A1 | 8/2003 |

OTHER PUBLICATIONS

An Office Action mailed by the Japanese Patent Office dated May 11, 2021, which corresponds to Japanese Patent Application No. 2019-041580 and is related to U.S. Appl. No. 16/810,197; with English language translation.

*Primary Examiner* — Ryan A Jarrett
(74) *Attorney, Agent, or Firm* — Studebaker & Brackett PC

(57) ABSTRACT

Provided is a numerical control system of a machine tool that can shorten a cycle time. A command unit of a numerical control system of a machine tool includes: an interpolation block waveform drawing unit that performs a simulation of an NC program, calculates an interpolation pulse of a relationship between speed and time indicating an operation of the respective axes from a command value of an axis address of the respective axes, and sequentially outputs an interpolation command of the respective axes for each block to draw a waveform of the relationship between speed and time in a case of operating the machine tool; a different axis block specifying unit that compares two blocks adjacent in time series which are drawn by the interpolation block waveform drawing unit, and specifies the two adjacent blocks calculated from command values of different axis addresses; and an interpolation overlap block waveform creating unit that obtains an overlappable amount of the two adjacent blocks specified by the different axis block specifying unit, and overlaps the two adjacent blocks on a basis of the overlappable amount to create a waveform of the relationship between speed and time in a case of operating the machine tool.

6 Claims, 9 Drawing Sheets

(56) References Cited

U.S. PATENT DOCUMENTS

2014/0195037 A1\* 7/2014 Nishibashi ......... G05B 19/4103
    700/188
2016/0103446 A1\* 4/2016 Aizawa ................ G05B 19/416
    700/188

\* cited by examiner ized numerical control (CNC) technology is applied in order for a computer to numerically control movement amount, moving speed, etc., thereby repeating the same operation, and highly automating complicated operations, etc. In addition, NC machine tools such as NC lathes and machining centers are consistently automated from design until manufacture by taking data created by CAD or CAM into CNC, and furthermore, by inputting and controlling various data such as options, parameters, NC programs, macro programs, macro variables, work origin offset, tool offset, tool shape data, tool management data, etc.

NUMERICAL CONTROL SYSTEM OF MACHINE TOOL

This application is based on and claims the benefit of priority from Japanese Patent Application No. 2019-041580, filed on 7 Mar. 2019, the content of which is incorporated herein by reference.

BACKGROUND OF THE INVENTION

Field of the Invention

The present invention relates to a numerical control system of a machine tool.

Related Art

As is well known, in the field of machine tools, computerized numerical control (CNC) technology is applied in order for a computer to numerically control movement amount, moving speed, etc., thereby repeating the same operation, and highly automating complicated operations, etc. In addition, NC machine tools such as NC lathes and machining centers are consistently automated from design until manufacture by taking data created by CAD or CAM into CNC, and furthermore, by inputting and controlling various data such as options, parameters, NC programs, macro programs, macro variables, work origin offset, tool offset, tool shape data, tool management data, etc.

The numerical control system of the machine tool, for example, in CNC (command unit), calculates interpolation pulses for each block (axis block, path block) indicating the operation of each axis (speed and time relationship or position and time relationship) of the X-axis, Y-axis, and Z-axis of the drive units of the machine tool, after issuing a command for the first block to drive the drive unit and completing this procedure, issues a command for the next block to drive the drive unit, and sequentially performs control so as to repeat the commands for the block, and the driving and the operation of the drive unit, and the completion of the procedure for each block. In other words, although the number of axes to be interpolated differs depending on the number of axis addresses commanded for each block, interpolation pulses are calculated for each block, the operation and the completion of the procedure are repeated to advance the NC program (machining program), and thus, the driving of the machine tool is controlled according to this NC program (see FIG. 2).

In other words, for example, it is controlled such that the command for each block (S1 to S4) indicating the start, the acceleration, the constant speed, the deceleration, or the stop (interpolation command) is issued in time series, and the drive unit of the next block is started when the drive unit of the previous block is stopped (see FIG. 2). In this way, the NC program is configured to sequentially start the interpolation command for the next block after waiting for the stop of the interpolation command for the previous block, whereby, even when the creator of the NC program independently issues interpolation commands of the X-axis, Y-axis, and Z-axis, interference is prevented from being caused with the components of the machine, members around the machine, workpieces, etc. in a movement path.

On the other hand, as shown in FIG. 9, the interference can be prevented from being caused even if the next block (interpolation command of the Z-axis) is started without waiting for the stop of the previous block and the completion of the procedure (interpolation command of the X-axis and Y-axis), and as a result, there are cases where the cycle time can be reduced.

For example, Patent Document 1 discloses a numerical control system (a numerical control device) that controls a machine tool to cause successive two fast-feed operations to overlap and perform the overlapping operation on a path where a workpiece and a tool do not interfere with each other, the system including: a means for storing a tool shape and a workpiece shape; a means for interpreting an overlap command for causing successive two feed-forward operation to overlap; a means for calculating a start position of an overlap path in accordance with the overlap command based on stored information of the tool shape and the workpiece shape; and means for starting, when a relative position between the workpiece and the tool reaches the start position during one rapid traverse operation in one fast-feed operation, the other fast-feed operation.

Patent Document 1 Japanese Unexamined Patent Application, Publication No. 2008-046913

SUMMARY OF THE INVENTION

Here, it is possible to create a movement path that can prevent interference from being caused even when the next block (interpolation command of the Z axis) is started without using the command of the axis address in the NC program, using a macro program or the like, and without waiting for the stop of the previous block (interpolation command of the X axis and Y axis) and the completion of the procedure.

However, in this case, knowledge on how to make macro programs is necessary, and it is very difficult for those who do not have sufficient knowledge to obtain such a movement path. Furthermore, even if a person has such knowledge, since the operation to design and verify such macro programs for each block of the NC programs is necessary, it will take a great deal of time and labor to create the NC programs.

Patent Document 1 simply discloses that the start and the acceleration portions of the next block are made to overlap with the deceleration portion of the interpolation command of the previous block. Therefore, it is impossible to effectively shorten the cycle time to the utmost. In addition, there is also a possibility of causing interference with components of a machine, members around the machine, workpieces, etc. in a movement path.

According to an aspect of the present disclosure, a numerical control system of a machine tool includes: a command unit; and a control unit that controls a drive unit of respective axes of the machine tool in accordance with a command from the command unit, the command unit including: an interpolation block waveform drawing unit that performs a simulation of an NC program, calculates an interpolation pulse of a relationship between speed and time or a relationship between position and time indicating an operation of the respective axes from a command value of an axis address of the respective axes, and sequentially outputs an interpolation command of the respective axes for each block to draw a waveform of the relationship between speed and time or the relationship between position and time in a case of operating the machine tool; a different axis block specifying unit that compares two blocks adjacent in time series which are drawn by the interpolation block waveform drawing unit, and specifies the two adjacent blocks calculated from command values of different axis addresses; and an interpolation overlap block waveform creating unit that obtains an overlappable amount of the two adjacent blocks specified by the different axis block specifying unit, and overlaps the two adjacent blocks specified by the different axis block specifying unit on a basis of the overlappable amount to create a waveform of the relationship between speed and time or the relationship between position and time in a case of operating the machine tool.

According to an aspect of the present disclosure, the interpolation block waveform drawing unit sequentially outputs an interpolation command of respective axes for each block, and draws a waveform of the relationship between speed and time or the relationship between position or time similar to that in the conventional method in a case of operating the machine tool, and the different axis block specifying unit sequentially compares the two blocks adjacent to each other in the time series of the waveform similar to that in the conventional method, and specifies the two adjacent blocks calculated from the command values of the different axis addresses. Thereafter, the interpolation overlap block waveform creating unit obtains the overlappable amount of the adjacent two blocks specified by the different axis block specifying unit, and overlaps the adjacent two blocks specified by the different axis block specifying unit on the basis of the overlappable amount to thereby create the relationship between the speed and time or the relationship between position and time in a case of operating the machine tool. Thereafter, by overlapping the block on the basis of the overlappable amount by which interference with the components of the machine, the members around the machine, workpieces, etc., does not occur in the movement path.

DETAILED DESCRIPTION OF THE INVENTION

Hereinafter, with reference to FIGS. 1 to 8, a numerical control system of a machine tool according to an embodiment will be described.

Figure 1:
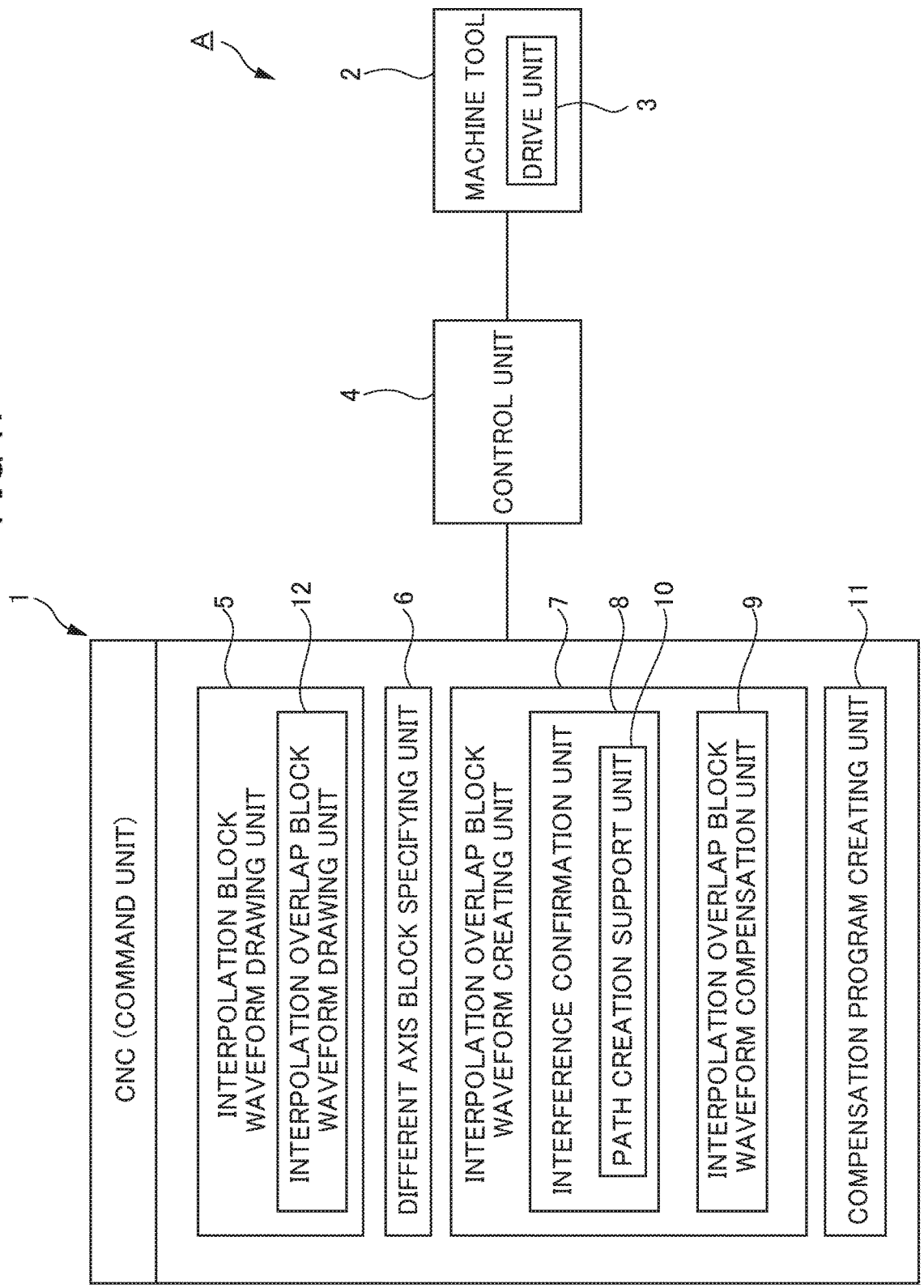
FIG. 1 is a block diagram showing a numerical control system of a machine tool according to an embodiment.

As shown in FIG. 1, a numerical control system A of a machine tool of the present embodiment includes a CNC1 of a command unit, and a control unit 4 for controlling a drive unit 3 of each axis (X-axis, Y-axis, and Z-axis) of a machine tool 2 on the basis of commands from the CNC1. Examples of the drive unit 3 include a servo motor, a stepping motor, and the like, and examples of the control unit 4 include a servo amplifier, and the like.

Furthermore, the control unit 4 includes an interpolation block waveform drawing unit 5, a different axis block specifying unit 6, an interpolation overlap block waveform creating unit 7, and a compensation program creating unit 11.

Figure 2:
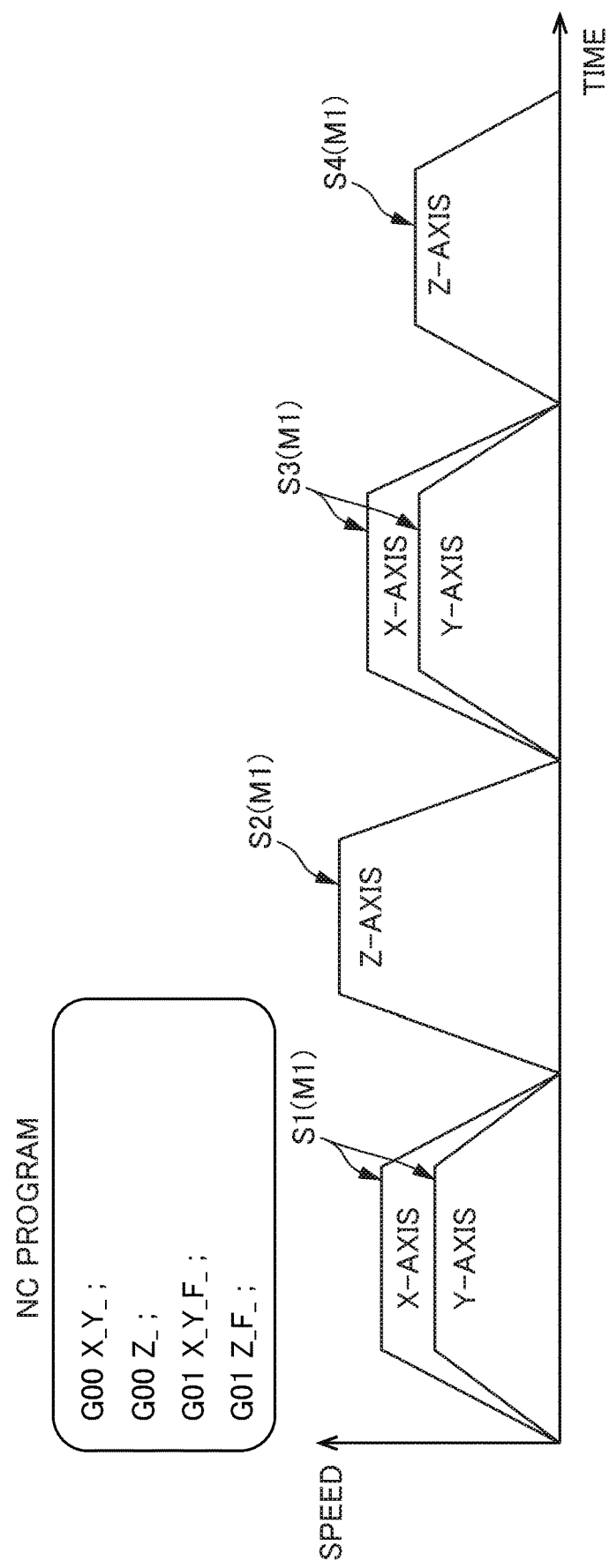
FIG. 2 is a diagram showing an example of a waveform similar to that of the conventional method, which is created by an interpolation overlap block waveform creating unit of a numerical control system of a machine tool according to an embodiment and in which blocks of each axis are not overlapped.

The interpolation block waveform drawing unit 5 performs a machining simulation of the NC program; for example, as shown in FIGS. 1 and 2, calculates the interpolation pulses of the relationship between speed and time (or the relationship between position and time) indicating the operation of each axis from the command values of the axis addresses of each axis of the X-axis, Y-axis, and Z-axis; and sequentially outputs the interpolation commands of each axis for each of the blocks S1 to S4 to thereby draw the waveform M1 of the relationship between speed and time in a case of operating the machine tool 2.

When numerical control of the machine tool 2 is performed using the numerical control system A of the machine tool of the present embodiment, first, a machining simulation is performed by the interpolation block waveform drawing unit 5 to draw a waveform M1 similar to that in the conventional method in which the blocks S1 to S4 of each axis of the X-axis, the Y-axis, and the Z-axis of the machine tool 2 are not overlapped. It should be noted that, in the present embodiment, a description is given as to draw the waveform M1 of the relationship between speed and time when operating the machine tool 2 according to the NC program; however, the waveform M1 may be a relationship between position and time.

Figure 3:
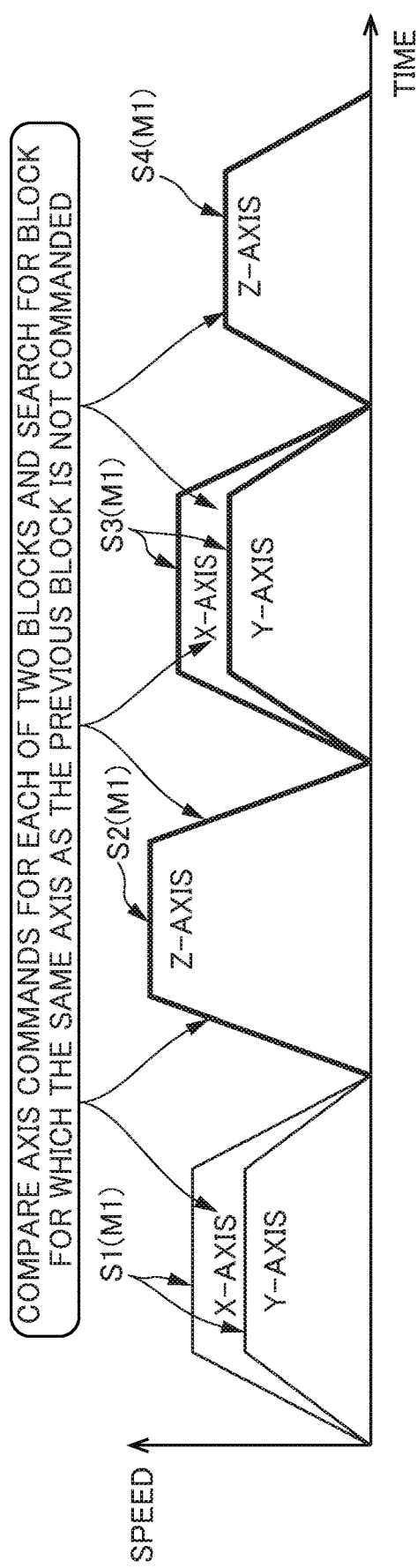
FIG. 3 is a diagram showing an example of a waveform of a state in which an overlappable block is specified by a different axis block specifying unit of a numerical control system of a machine tool according to an embodiment.

The different axis block specifying unit 6, as shown in FIGS. 1 and 3, compares two blocks adjacent in the time series (S1 and S2, S2 and S3, and S3 and S4) which are drawn by the interpolation block waveform drawing unit 5, and specifies two adjacent blocks (in this embodiment, S1 and S2, S2 and S3, and S3 and S4 of different axis) calculated from the command values of the different axis addresses.

Figure 4:
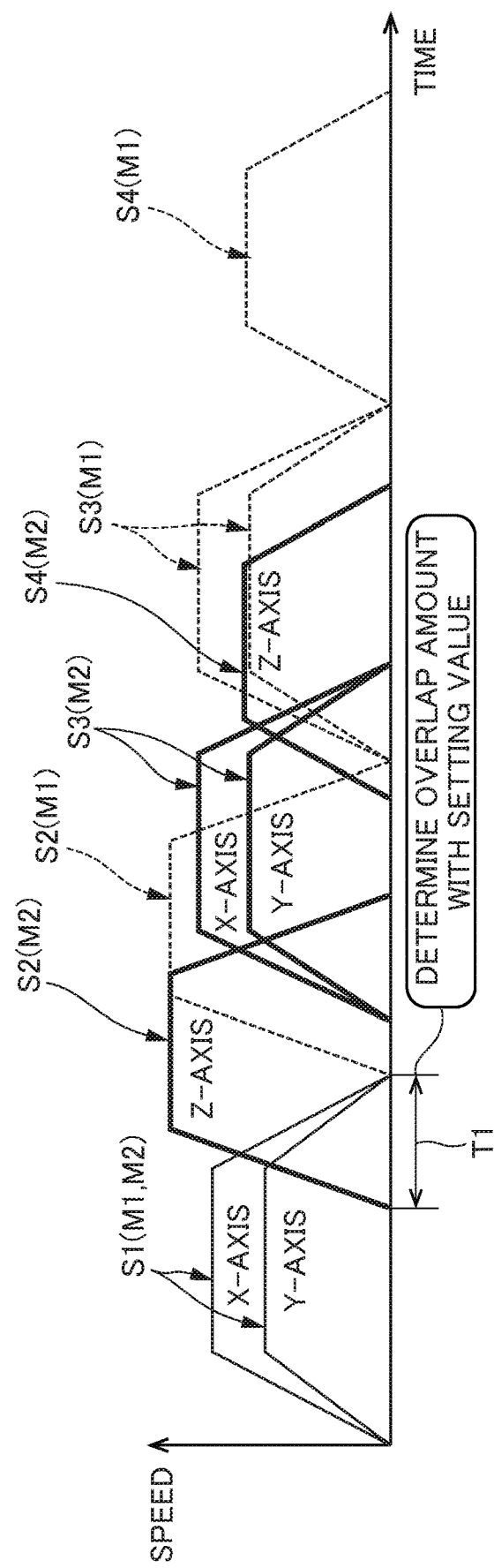
FIG. 4 is a diagram showing an example of a waveform in a state in which a block specified by a different axis block specifying unit of a numerical control system of a machine tool according to an embodiment is overlapped by an overlappable amount.

The interpolation overlap block waveform creating unit 7, as shown in FIGS. 1 and 4, obtains the overlappable amount (setting value) (T1) of the two adjacent blocks (S1 and S2, S2 and S3, and S3 and S4) specified by the different axis block specifying unit 6, and overlaps the two adjacent blocks (S1 and S2, S2 and S3, and S3 and S4) specified by the different axis block specifying unit 6 on the basis of the overlappable amount (T1) to thereby create a waveform M2 of the relationship between speed and time in a case of operating the machine tool 2.

The interpolation overlap block waveform creating unit 7 includes an interpolation overlap block waveform drawing unit 12 which highlights overlapped two adjacent blocks (S1 and S2, S2 and S3, and S3 and S4), and draws the waveform M2 of the relationship between speed and time when operating the machine tool 2. It should be noted that, although the highlighted display is performed with a bold line in FIG. 4, it may of course be highlighted such as by adding a color such as red.

Figure 5:
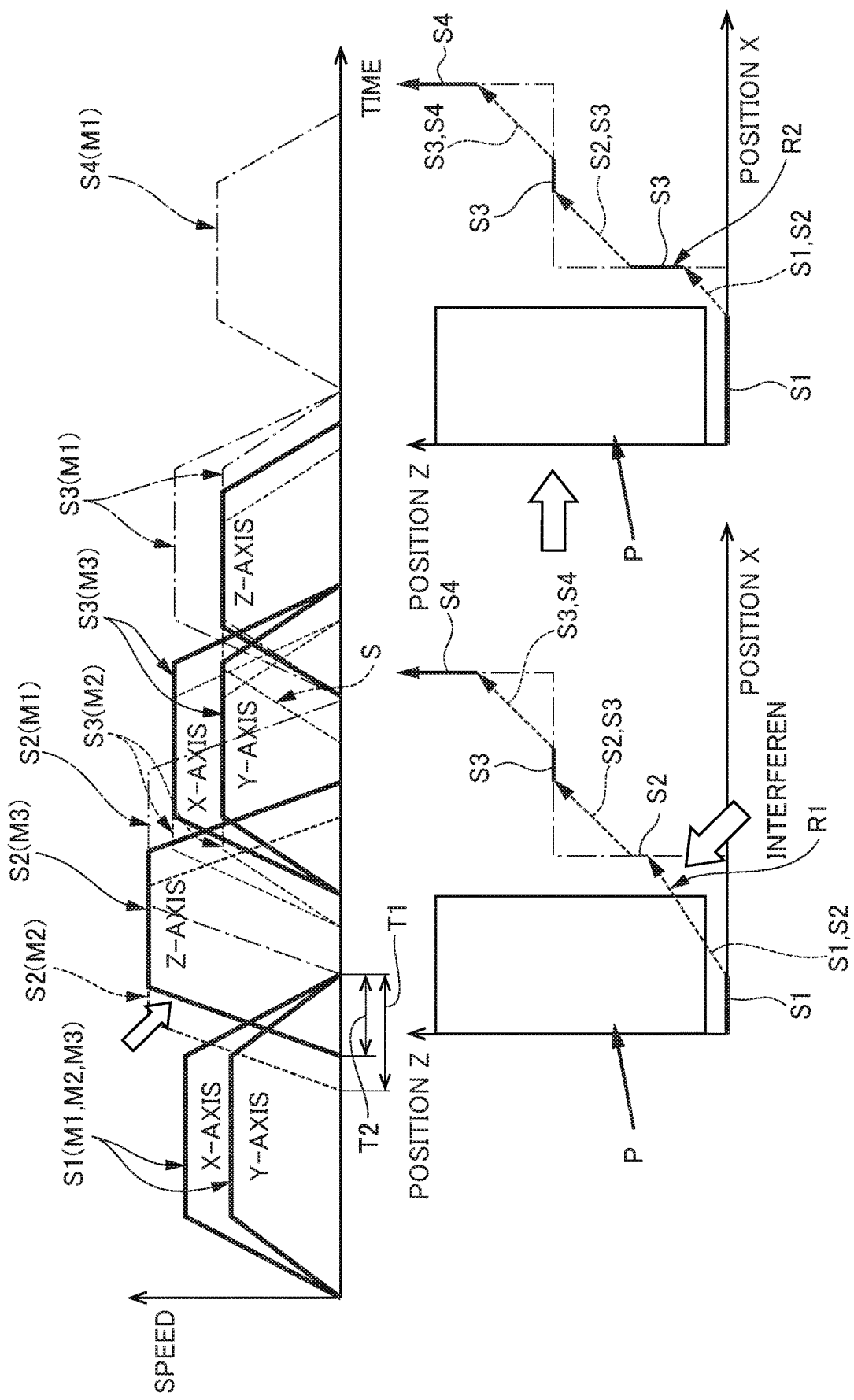
FIG. 5 is a diagram showing an example of a waveform in a state in which the amount of overlap is adjusted by an interference confirmation unit and an interpolation overlap block waveform compensation unit of a numerical control system of a machine tool according to an embodiment.

Furthermore, the interpolation overlap block waveform creating unit 7 of the present embodiment, as shown in FIGS. 1 and 5, includes an interference confirmation unit 8 for confirming whether interfering with the components of the machine or the members around the machine, workpieces, etc. (foreign object P) when the machine tool 2 is operated in the waveform M2 in which two blocks adjacent to each other (S1 and S2, S2 and S3, and S3 and S4) are overlapped by an overlappable amount T1, and an interpolation overlap block waveform compensation unit 9 that overlaps two adjacent blocks (S1 and S2, S2 and S3, and S3 and S4) by an overlap amount (T2) where interference does not occur to compensate a waveform M3 when interference is confirmed by the interference confirmation unit 8.

The interference confirmation unit 8 includes a path creation support unit 10 for displaying a path when operating with the waveform M2 created by the interpolation overlap block waveform creating unit 7 and a foreign object P. The interpolation overlap block waveform compensation unit 9 is configured to compensate a path R1 displayed by the path creation support unit 10 so as not to interfere with the foreign object P, and to set an overlap amount T2 and a path R2 that does not interfere with the foreign object P.

In the present embodiment, the compensation program creating unit 11 compensates the NC program in accordance with the waveform M3 compensated by the interpolation overlap block waveform compensation unit 9.

Furthermore, when numerical control of the machine tool 2 is performed using the numerical control system A of the machine tool of the present embodiment, with respect to the waveform M1 (refer to FIG. 2) drawn by the interpolation block waveform drawing unit 5, as shown in FIG. 3, the different axis block specifying unit 6 identifies the commands (blocks: S1 and S2, S2 and S3, and S3 and S4) that can overlap the operation control of each axis of the X-axis, the Y-axis, and the Z-axis while avoiding the machine components driven around each axis of the X-axis, the Y-axis, and the Z-axis from interfering with the components of the other machines, the members around the machines, the foreign objects P such as workpieces, etc., based on the relationship among the other commands.

At this time, the different axis block specifying unit 6 determines whether there is an overlappable command from the beginning of the NC program. In other words, the program of the previous block and the program of the next block are compared, and whether the same axis address as the previous block is commanded or not is determined. Furthermore, the program of the previous block and the program of the next block are compared, and whether the same axis address is commanded or not is determined. Furthermore, searching for commands with no axis addresses in the previous and next blocks is performed, and overlappable axis addresses are found. For example, in FIG. 3 (FIG. 4), the Z-axis is specified (identified/determined) as an overlappable command.

Next, as shown in FIGS. 3 and 4, the interpolation overlap block waveform creating unit 7 obtains the overlappable amount (T1) of the two adjacent blocks (S1 and S2, S2 and S3, and S3 and S4) specified by the different axis block specifying unit 6, and overlaps the specified two adjacent blocks (S1 and S2, S2 and S3, and S3 and S4) on the basis of the setting value of the overlappable amount (T1) to thereby create the waveform M2 of the relationship between speed and time in a case of operating the machine tool 2.

At this time, in the interpolation overlap block waveform drawing unit 12 of the interpolation overlap block waveform creating unit 7, a candidate of overlap is highlighted, the overlapped two adjacent blocks (S1 and S2, S2 and S3, and S3 and S4) are highlighted, and the waveform M2 of the relationship between speed and time in a case of operating the machine tool 2 is drawn.

Next, as shown in FIG. 5, in a case in which the machine tool 2 is operated by the waveform M2 in which the two blocks adjacent to each other (S1 and S2, S2 and S3, and S3 and S4) are overlapped by the overlappable amount T1, the interference confirmation unit 8 confirms whether or not interfering with the components of the machine, members around the machine, and foreign objects P such as the workpieces.

Furthermore, when the interference is confirmed by the interference confirmation unit 8, the interpolation overlap block waveform compensation unit 9 overlaps the two adjacent blocks (S1 and S2, S2 and S3, and S3 and S4) by the overlap amount (T2) at which the interference does not occur, to thereby compensate the waveform M3.

At this time, in the present embodiment, the path R1 and the foreign object P at the time of operating in the waveform M2 created by the interpolation overlap block waveform creating unit 7 are displayed together with the waveform M2 by the path creation support unit 10, and while the operator sees this display, a movement path proposal (R1) is compensated manually by the interpolation overlap block waveform compensation unit 9 to thereby create the path R2 that does not interfere with the foreign object P and the waveform M3 of the overlap amount (T2) corresponding to the path R2.

Thus, by assisting the creation of the path R2 that does not interfere with the foreign object P using the path creation support unit 10 and the interpolation overlap block waveform compensation unit 9, it is possible to create and adjust the waveform M3 easily so that a target command comes in an appropriate timing by confirming the position or time.

In the present embodiment, although the operator was intended to manually compensate the movement path proposal (R1), of course, it may be configured to compensate automatically.

Figure 6:
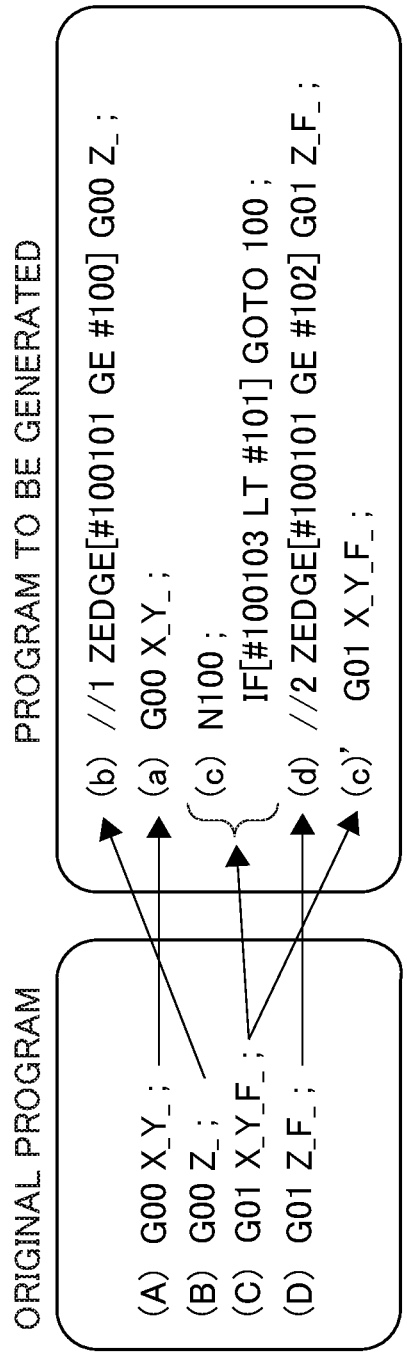
FIG. 6 is a diagram showing an example of a compensation situation of an NC program in a compensation program creating unit of a numerical control system of a machine tool according to an embodiment.

Finally, as shown in FIG. 6, using the compensation program creating unit 11, the NC program is compensated to match the waveform M3 compensated by the interpolation overlap block waveform compensation unit 9.

Figure 7:
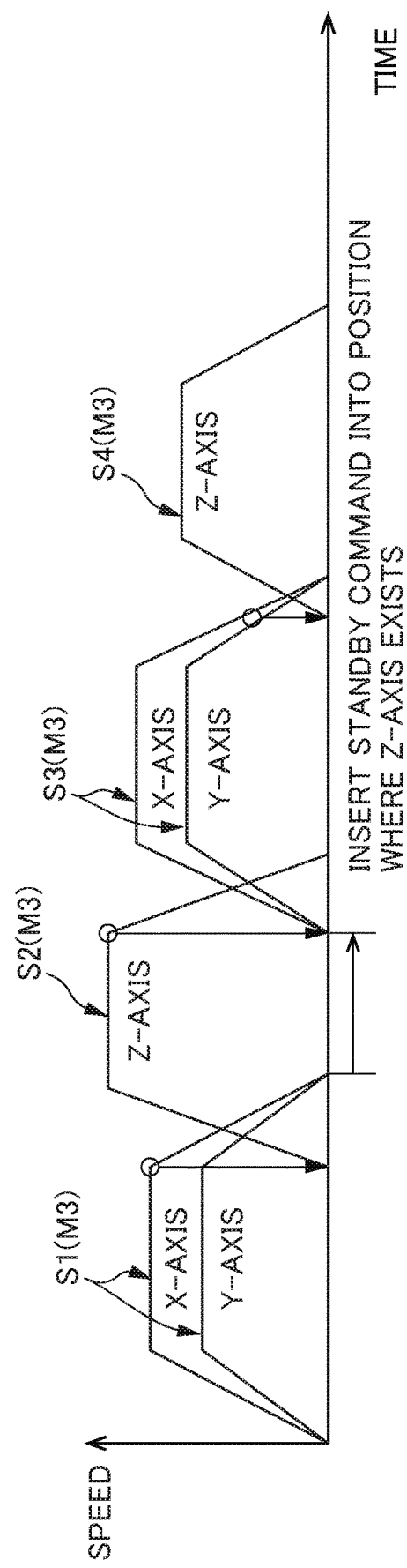
FIG. 7 is a view used in an explanation in which an NC program is compensated in a compensation program preparation unit of a numerical control system of a machine tool according to an embodiment.

At this time, for example, when editing the NC program in accordance with the waveform M3 of the blocks S1 to S4 adjusted by the overlap amount T2, as shown in FIG. 7, the NC program is compensated so that a standby command is inserted into a position where the Z-axis exists and is replaced with a command in which the position of the X-axis is set as a start condition. Of course, the compensation method of the NC program may be performed and the content of compensation of the NC program may be determined with a condition of the position of any other axis, and thus, are not necessarily limited to the above.

More specifically, when compensating the NC program, an NC program that is automatically edited by a CNC1 (compensation program creating unit 11) is shown in the program to be created.

For example, as shown in FIG. 6, the start (A) of the original NC program is set to (a) as a reference. The contents of the block in (a) are not edited.

In a case in which (a) reaches a reference position during automatic operation, a macro program (b) to start a movement command (B) is inserted into the start of the program. (b) waits for the condition to be satisfied, and a movement command corresponding to (B) is performed.

A macro program (c) that waits for execution until the reference position is reached so that a movement command of (C) starts when (b) reaches the reference position is inserted.

Next, the movement command of (C) is performed. A macro program (d) that starts a movement command of (D) when (c) and (c)' reach the reference position during automatic operation is inserted. It should be noted that "F" in the NC program in FIG. 6 shows the feed rate.

In the numerical control system A of the machine tool of the present embodiment configured as described above, by overlapping the blocks S1 to S4 on the basis of the overlappable amount by which interference to the components of the machine, the members around the machine, workpieces, and other foreign object P does not occur in the movement path, it becomes possible to create a movement path that can reliably prevent interference relatively easily, and it is also possible to effectively (reasonably) realize a shortening of the cycle time.

Furthermore, the two overlapped adjacent blocks S1 to S4 are highlighted by the interpolation overlap block waveform drawing unit 12, and the waveforms M2 and M3 of the relationship between speed and time (or the relationship between position and time) in a case of operating the machine tool 2 are drawn. This makes it possible to easily recognize and identify an overlap candidate and the two overlapped adjacent blocks (S1 and S2, S2 and S3, and S3 and S4) by highlighting them.

Furthermore, by providing the interpolation overlap block waveform creating unit 7 with the interference confirmation unit 8 and the interpolation overlap block waveform compensation unit 9, in a case in which the machine tool 2 is operated in the waveform M2 in which the two blocks adjacent to each other (S1 and S2, S2 and S3, and S3 and S4) are overlapped by the overlappable amount T1, it is possible to confirm whether or not the machine tool 2 interferes with the components of the machine, members around the machine, or foreign objects P such as the workpieces. Furthermore, in a case in which the interference is confirmed by the interference confirmation unit 8, the two adjacent blocks (S1 and S2, S2 and S3, and S3 and S4) by the overlap amount (T2) by which interference does not occur are overlapped by the interpolation overlap block waveform compensation unit 9, making it possible to easily compensate the waveform M3.

By the interference confirmation unit 8 including the path creation support unit 10 that displays the path R1 when operated in the waveform M2 created by the interpolation overlap block waveform creating unit 7 and the foreign object P, it is possible to compensate the movement path proposal (R1) by the interpolation overlap block waveform compensation unit 9 while the operator watches this display, and create the path R2 which does not interfere with the object P and the waveform M3 of the overlap amount (T2) corresponding to this path R2.

With such a configuration, by using the path creation support unit 10 and the interpolation overlap block waveform compensation unit 9, and assisting the creation of the path R2 that does not interfere with the foreign object P, it is possible to create and adjust the waveform M3 easily so that the target command comes in an appropriate timing by confirming the position or time.

Furthermore, by the interpolation overlap block waveform creating unit 7 being configured to manually overlap the two adjacent blocks S1 to S4 specified by the different axis block specifying unit 6 to compensate the waveform M3, it is possible to suitably compensate and create the waveform M3 while the operator visually recognizes and confirms the situation.

Accordingly, in the numerical control system A of the machine tool of the present embodiment, a movement path that greatly overlaps, which cannot be set by the interpolation command for each of the blocks S1 to S4 of the NC program, can be realized by editing the NC program including the macro program, and thus, it is possible to shorten the cycle time.

Furthermore, it becomes possible to effectively shorten the operation time of parts machining by using the NC program which provides an optimum movement path considering the overlap in advance, when the same NC program is repetitively used such as in parts machining.

Furthermore, the CNC1 automatically generates the NC program including the macro program from the NC program. Therefore, it becomes possible to create the NC program which is a movement path including a complicated macro program, even if the operator, etc. does not have knowledge of the macro program.

Furthermore, even those who have knowledge of the macro program can omit the design and confirmation operation of the macro program which is complicated logic, and it becomes possible to shorten the operation time.

Therefore, according to the numerical control system A of the machine tool of the present embodiment, the path that can be overlapped more than the relationship of the interpolation command of the NC program is automatically calculated as a macro program, the presented machining path can be applied to the CNC1, and the NC program that enables the interference to be avoided can be created without requiring a great deal of labor and time, thereby enabling an effective (reasonable) shortening of the cycle time to be realized.

An embodiment of the numerical control system of the machine tool has been described above. However, the present invention is not limited to the embodiment described above, and it can be changed where appropriate within a scope not deviating from the spirit thereof.

Figure 8:
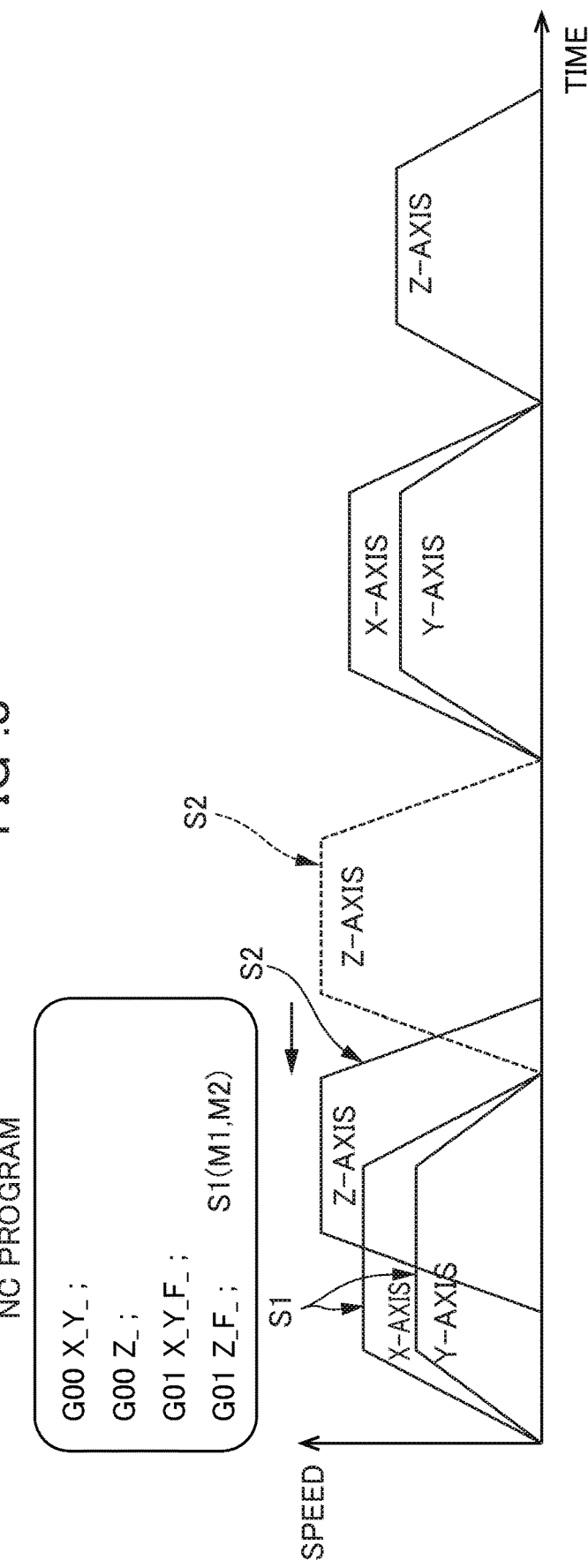
FIG. 8 is a diagram showing another example of a waveform in a state in which a block specified by a different axis block specifying unit of a numerical control system of a machine tool according to an embodiment is overlapped by an overlappable amount.
Figure 9:
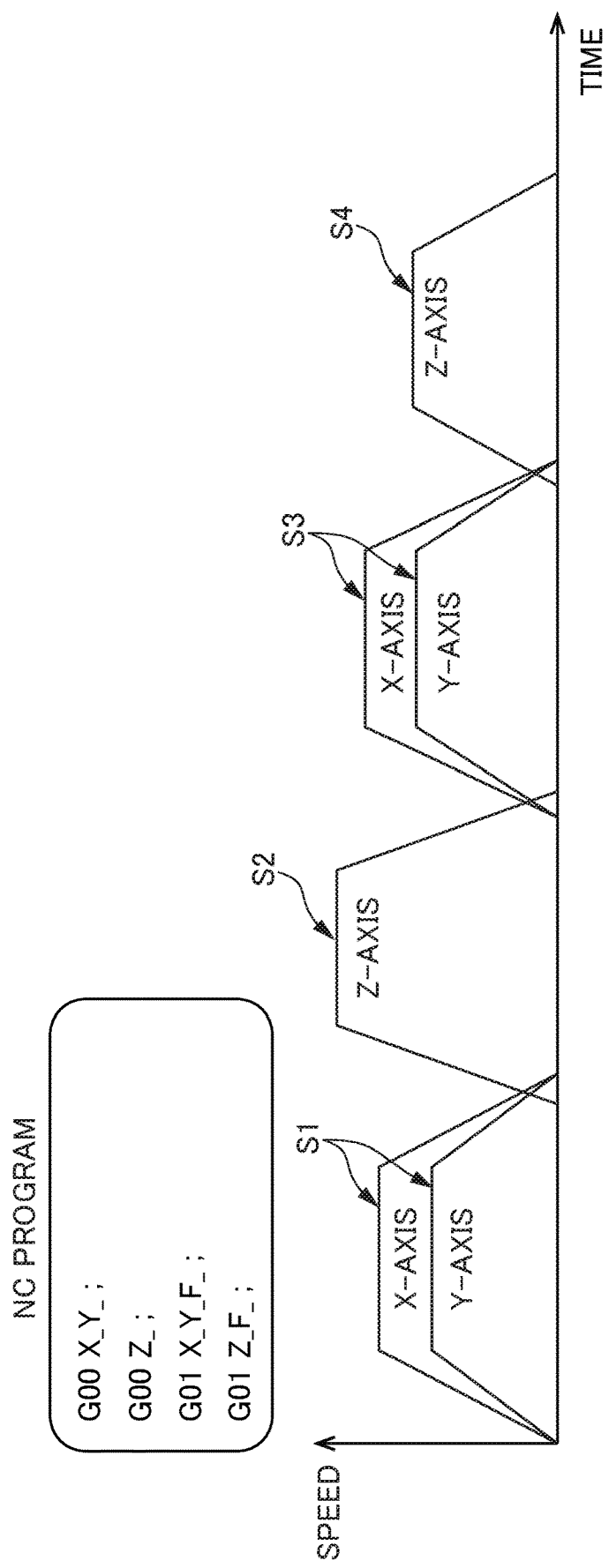
FIG. 9 is a diagram showing a waveform in a state in which blocks are overlapped by a conventional method.

For example, in the numerical control system A of the machine tool of the present embodiment, the blocks S2 to S3 are moved in parallel and overlapped in a time series on the basis of the overlappable amount by which the interference to the components of the machine, the members around the machine, workpieces, etc. does not occur in the movement path. Therefore, for example, as shown in FIG. 8, an acceleration portion of the next block S2 may be overlapped with a constant speed portion of the previous block S1, thereby making it possible to realize the shortening of the cycle time effectively (reasonably).

EXPLANATION OF REFERENCE NUMERALS

1 CNC (command unit)
2 machine tool
3 drive unit
4 control unit
5 interpolation block waveform drawing unit
6 different axis block specifying unit 7 interpolation overlap block waveform creating unit
8 interference confirmation unit
9 interpolation overlap block waveform compensation unit
10 path creation support unit
11 compensation program creating unit
12 interpolation overlap block waveform drawing unit
A numerical control system of machine tool
M1 to M3 waveform
S1 to S4 block (interpolation command)
T1 overlappable amount (setting value)
T2 overlap amount

What is claimed is:

1. A numerical control system of a machine tool, the numerical control system comprising:
 a command unit; and
 a control unit that controls a drive unit of respective axes of the machine tool in accordance with a command from the command unit,
 the command unit comprising:
 an interpolation block waveform drawing unit that performs a simulation of an NC program, calculates an interpolation pulse of a relationship between speed and time or a relationship between position and time indicating an operation of the respective axes from a command value of an axis address of the respective axes, and sequentially outputs an interpolation command of the respective axes for each block to draw a waveform of the relationship between speed and time or the relationship between position and time in a case of operating the machine tool;
 a different axis block specifying unit that compares two blocks adjacent in time series which are drawn by the interpolation block waveform drawing unit, and specifies the two adjacent blocks calculated from command values of different axis addresses; and
 an interpolation overlap block waveform creating unit that obtains an overlappable amount of the two adjacent blocks specified by the different axis block specifying unit, and overlaps the two adjacent blocks specified by the different axis block specifying unit on a basis of the overlappable amount to create a waveform of the relationship between speed and time or the relationship between position and time in a case of operating the machine tool.

2. The numerical control system of the machine tool according to claim 1,
 wherein the interpolation overlap block waveform creating unit includes an interpolation overlap block wave drawing unit which highlights the two adjacent blocks that are overlapped, and draws a waveform of the relationship between speed and time or the relationship between position and time in a case of operating the machine tool.

3. The numerical control system of the machine tool according to claim 1, wherein the interpolation overlap block waveform creating unit includes:
 an interference confirmation unit that confirms whether interfering with a foreign object in a case of operating the machine tool in a waveform in which the two adjacent blocks are overlapped by the overlappable amount; and
 an interpolation overlap block waveform compensation unit that overlaps the two adjacent blocks by an overlap amount where interference does not occur to compensate a waveform when interference is confirmed by the interference confirmation unit.

4. The numerical control system of the machine tool according to claim 3, further comprising a compensation program creating unit that compensates the NC program to match the waveform compensated by the interpolation overlap block waveform compensation unit.

5. The numerical control system of the machine tool according to claim 3, wherein
 the interference confirmation unit includes a path creation support unit that displays a path when operated in a waveform created by the interpolation overlap block waveform creating unit, and the foreign object, and
 the interpolation overlap block waveform compensation unit compensates the path displayed by the path creation support unit to set the overlap amount so as not to interfere with the foreign object.

6. The numerical control system of the machine tool according to claim 1, wherein the interpolation overlap block waveform creating unit is configured to allow manually overlapping the two adjacent blocks specified by the different axis block specifying unit to compensate the waveform.

* * * * *